Patented June 10, 1952

2,599,996

UNITED STATES PATENT OFFICE 2,599,996

DIPHENYL ACETIC ACID-β-(N-CYCLOHEPTYL-METHYLAMINO)-ETHYL ESTER AND SALTS THEREOF

Karl Hoffmann, Binningen, and Max Spillmann, Basel, Switzerland, assignors to Ciba Pharmaceutical Products, Inc., Summit, N. J.

No Drawing. Application December 26, 1951, Serial No. 263,503. In Switzerland January 19, 1951

3 Claims. (Cl. 260—469)

The present invention relates to diphenyl acetic acid-β-(N-cycloheptyl-methylamino)-ethyl ester of the formula

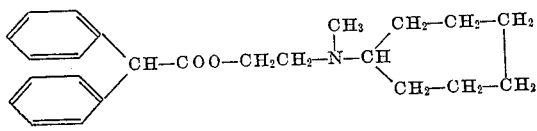

and its salts.

This new compound has a specific spasmolytic effect upon the smooth musculature. It can be employed as a spasmolytic especially for spastic conditions of the vegetative organs with smooth musculature, as for example the blood vessels, the gastro-intestinal tract, the gall bladder and the urogenital system. In this connection it is of particular interest to emphasize that the new compound has a more specific effect than the known comparable esters, as for example the diphenyl acetic acid-β-diethylamino-ethyl ester. This property is the more surprising since it has been found that in the case of corresponding esters which have not hitherto been described in literature and which possess a cyclopentyl or cyclohexyl group instead of the cycloheptyl group, this specific effect does not exist. Moreover compared with the said corresponding esters, the additional characteristic advantage should be mentioned that the new ester possesses only a small parasympathicolytic effect.

The new ester may be obtained in a variety of ways. Thus diphenyl acetic acid or its halides or esters, or its anhydride may be reacted with N-(β-hydroxyethyl)-N-cycloheptyl-methylamine or its salts. It is also possible to react diphenylacetic acid or its salts upon esters of the specified amino alcohol and hydrohalic acids.

Depending upon the method of operation, the new compound is obtained as base or in the form of a salt. From the free base salts may be produced in the customary manner, as for example by reacting the diphenyl acetic acid-β-(N-cycloheptyl-methylamino)-ethyl ester with the hydrohalic acids, sulfuric acid, nitric acid, phosphoric acid, thiocyanic acid, acetic acid, propionic acid, oxalic acid, malonic acid, succinic acid, malic acid, tartaric acid, benzoic acid, methane sulfonic acid, ethane sulfonic acid, hydroxyethane sulfonic acid or benzene or toluene sulfonic acid, thereby producing the corresponding halide, sulfate, nitrate, phosphate, thiocyanate, acetate, propionate, oxalate, malonate, succinate, tartrate, benzoate, malate, methane sulfonate, ethane sulfonate, hydroxyethane sulfonate or benzene or toluene sulfonate, respectively.

The following examples illustrate the invention, the relation between part by weight and part by volume being the same as that between gram and cubic centimeter:

Example 1

111 parts by weight of diphenyl acetic acid, 73 parts by weight of potassium carbonate, 100 parts by weight of N-(β-chlorethyl)-N-(cycloheptyl)-methylamine and 1000 parts by volume of ethyl acetate are heated with stirring to 70° C. for 15 hours. After cooling, dilute hydrochloric acid is added to give a permanent acid reaction, the ethyl acetate layer is separated, the aqueous solution rendered alkaline with potassium carbonate and the separated base taken up in ether. From the ether solution there are obtained by drying, evaporation of the ether and distillation of the residue, 168 parts by weight of diphenyl acetic acid-β-(N-cycloheptyl-methylamino)-ethyl ester of boiling point 190–192° C. under 0.15 mm. pressure. By reacting the base with oxalic acid there is obtained the corresponding oxalate which melts at 149–150° C. In usual manner a halide, the sulfate, nitrate, phosphate, propionate or succinate can be prepared.

Example 2

21.2 parts by weight of diphenyl acetic acid, 19 parts by weight of N-(β-chlorethyl)-N-cycloheptyl-methylamine and 100 parts by volume of isopropyl alcohol are heated for 8 hours on the water bath. After cooling and adding 100 parts by volume of absolute ether, there crystallize 30 parts by weight of diphenyl acetic acid-β-(N-cycloheptyl-methylamino)-ethyl ester hydrochloride, melting at 102–103° C.

Example 3

A solution of 23 parts by weight of diphenyl acetic acid chloride in 50 parts by volume of absolute benzene, is gradually added with stirring and ice cooling, to a solution of 17.1 parts by weight of N-(β-hydroxy-ethyl)-N-cycloheptyl-methylamine in 100 parts by volume of benzene and the mixture then boiled for 2 hours. After evaporation of the benzene the residue is dissolved in water and extracted with ether. The separated aqueous solution is rendered alkaline with potassium carbonate and the separated base taken up in ethyl acetate and the solution dried. To this solution there are gradually added with stirring and cooling 9 parts by weight of methane sulfonic acid. The diphenyl acetic acid-β-(N- cycloheptyl-methylamino)-ethyl ester methane sulfonate crystallizes out; it melts at 110.5-111° C. In analogous manner the ethane sulfonate, hydroxyethane sulfonate, the benzene or toluene sulfonate can be prepared.

*Example 4*

2 parts by weight of sodium are dissolved in 200 parts by weight of N-(β-hydroxyethyl)-N-cycloheptyl-methylamine and 50.2 parts by weight of diphenylacetic acid methyl ester added to the solution. The mixture produced is boiled under reflux for 3 hours at a pressure of approximately 5 mm. After cooling, the whole is treated with dilute hydrochloric acid to give a permanent acid reaction, and ethyl acetate is added. After thorough shaking working up is carried out in a similar manner to that described in Example 1. 36.5 parts by weight of the above described diphenylacetic acid - β - (N-cycloheptyl - methyl - amino)-ethyl ester are obtained. The product is dissolved in 100 parts by volume of ethyl acetate and treated with a solution of 10.4 parts by weight of malonic acid in 300 parts by volume of ethyl acetate. The diphenyl acetic acid-β-(N-cycloheptyl-methylamino)-ethyl ester malonate crystallizes out. It melts at 116-117° C.

What is claimed is:

1. A member selected from the group consisting of diphenyl acetic acid-β-(N-cycloheptyl-methylamino)-ethyl ester and acid salts thereof.

2. Diphenyl acetic acid - β - (N-cycloheptyl-methylamino)-ethyl ester.

3. Diphenyl acetic acid - β - (N-cycloheptyl-methylamino)-ethyl ester methane sulfonate.

KARL HOFFMANN.
MAX SPILLMANN.

No references cited.